United States Patent [19]

Wallace et al.

[11] 4,244,245

[45] Jan. 13, 1981

[54] FASTENER TENSION CONTROL SYSTEM

[75] Inventors: William K. Wallace, Barneveld; David L. Rosbrook, Whitesboro, both of N.Y.

[73] Assignee: Chicago Pneumatic Tool Company, New York, N.Y.

[21] Appl. No.: 39,328

[22] Filed: May 16, 1979

[51] Int. Cl.³ .................. B23Q 19/06; G06F 15/20
[52] U.S. Cl. ........................ 81/469; 73/139; 73/761; 173/1; 173/12; 364/505
[58] Field of Search ............ 364/505, 508; 73/136 A, 73/136 B, 139, 761; 29/240, 407; 81/52.4 R, 52.5; 173/1, 12

[56] References Cited

U.S. PATENT DOCUMENTS

| | | | |
|---|---|---|---|
| 2,756,622 | 7/1956 | LaBelle | 73/139 |
| 4,008,772 | 2/1977 | Boys | 173/12 |
| 4,016,938 | 4/1977 | Rice | 173/12 |
| 4,019,589 | 4/1977 | Wallace | 173/12 |
| 4,026,369 | 5/1977 | Vliet | 173/12 |
| 4,104,778 | 8/1978 | Vliet | 364/508 |
| 4,106,176 | 8/1978 | Rice et al. | 364/508 |
| 4,110,829 | 8/1978 | Boys | 364/508 |
| 4,163,310 | 8/1979 | Sigmund | 364/505 |
| 4,163,311 | 8/1979 | Sigmund | 364/505 |
| 4,179,786 | 12/1979 | Eshghy | 173/12 |

Primary Examiner—Errol A. Krass
Attorney, Agent, or Firm—Stephen J. Rudy

[57] ABSTRACT

A method and apparatus for controlling final tension on a fastener being run up and set. An efficiency factor is developed and utilized for attaining predetermined final tension on a fastener, or a group of similar fasteners, being operated upon. The efficiency factor is a ratio between work on a theoretical fastener, i.e., one wherein friction load is absent in work calculations, and work on an actual fastener. Having obtained the efficiency factor, the actual torque load on a fastener to attain predetermined tension value, can be established by use of the efficiency factor.

7 Claims, 5 Drawing Figures

FASTENER TENSION CONTROL SYSTEM

BACKGROUND OF THE INVENTION

This invention relates to apparatus and a method for controlling torque applied to a fastener to achieve a predetermined final tension load on the fastener, or on each fastener of a group of like fasteners being simultaneously operated upon, and to constantly monitor torque and efficiency on each fastener of the group to assure that final tension load is maintained thereon until final tension load is developed on all fasteners of the group.

New and improved methods, or systems, are constantly being developed and utilized in the fastener tightening art. Most methods currently employed, operate to control torque to achieve desired ultimate fastener tension. In assembly operations, involving multiple fasteners, torque control monitoring permits the assembly to be checked to assure that all fasteners being operated upon attain predetermined final tension value before torque loading is terminated. However, the value of tension on a given fastener in an assembly operation depends upon certain variables such as friction and load in the assembly.

For any given fastener there is a constant relationship between fastener elongation, fastener tension or load, and fastener rotation relative to its fixed threaded counterpart, which relationship is not affected by friction. Some of the known fastener tightening systems attempt to utilize this relationship to control fastener tension. However, the means used to apply this relationship are affected by friction. Examples of frictional effects in known tightening systems are:

1. The known systems assume that the torque-angle curve is a straight-line, for the cycle portion where all rotation is absorbed by elongating the fastener. This straightline is used to establish a fastener's zero load point, from which the tightening angle is measured. If the frictional effects are not constant the straight-line assumption is incorrect and the fastener will not be tightened correctly.

2. Some of the known systems use the yield point of the torque-angle tightening curve to correlate tightening angle with bolt tension. However, yield point of a fastener, as developed on an actual torque-angle curve, is a result of stresses produced from fastener tension load as well as friction.

Another deficiency of the systems which control fastener rotation to achieve final tension, is that there is no way to check a completed assembly to determine if it has been tightened to the correct angle of rotation to obtain a tension specification.

The subject invention incorporates development of a theoretical torque-angle curve which is used to establish calculation of an efficiency factor. Such a curve is not used in known systems of the prior art. The converting of actual torque to fastener tension through such an efficiency factor and a fastener constant, is more accurate than relating an actual fastener yield point to bolt tension. Locating a theoretical curve with respect to the actual torque angle curve is simpler and more accurate than projecting the shape of the actual curve back to final zero load angle and then rotating to a predesignated angle to achieve desired final torque.

Development and use of the efficiency as disclosed herein allows measurement of fastener torque with a torque wrench the value of which, when multiplied by efficiency and a fastener constant, will determine the clamp load of the fastener under consideration. Such will allow a check of the system itself to determine if desired fastener tension has been developed, or can be later used to tighten a fastener to the torque required to achieve desired level of clamp load.

SUMMARY OF THE INVENTION

This invention utilizes a novel method and apparatus to accomplish the method whereby final tension load on a fastener can be accurately controlled, whether a single fastener is being operated upon, or a plurality of like fasteners in an assembly operation. By use of an efficiency factor which can be calculated, establishment of a theoretical torque angle curve can be made, whereby torque loading to achieve final tension in the fastener can be established.

It is a further feature of the invention that the disclosed system will measure the effect of friction during a tightening cycle and determine what torque is required to obtain the desired tension in the fastener, or fasteners being operated upon.

Another feature of the invention is that the system enables checking to see if desired tension loading is achieved, or to later determine what tension loading was achieved on a fastener.

These and further features and objects of the invention will be disclosed hereinafter including certain charts and diagrams as illustrated in the drawings wherein.

DESCRIPTION OF THE INVENTION

Referring to the curve showing an actual torque vs. angle curve as well as a theoretical curve (FIG. 1), the theoretical curve is a torque vs. angle curve without friction. The torque at yield (ty) is proportional to the fastener tension load at yield. The angle ($\alpha y$) is proportional to the amount of fastener elongation that occurred from no load to yield. Both of these values ($\alpha y$) and (ty) can be predetermined for any size and working length of fastener. The slope of the theoretical curve is $ty/\alpha y$ and will be referred to as ($C_1$). The equation for the theoretical curve is then: $t = C_1 \alpha$ Therefore, for an assembly where the portion of final tightening goes only into the elongation of the fastener the theoretical torque angle curve is $t = C_1 \alpha$.

Figure 3:
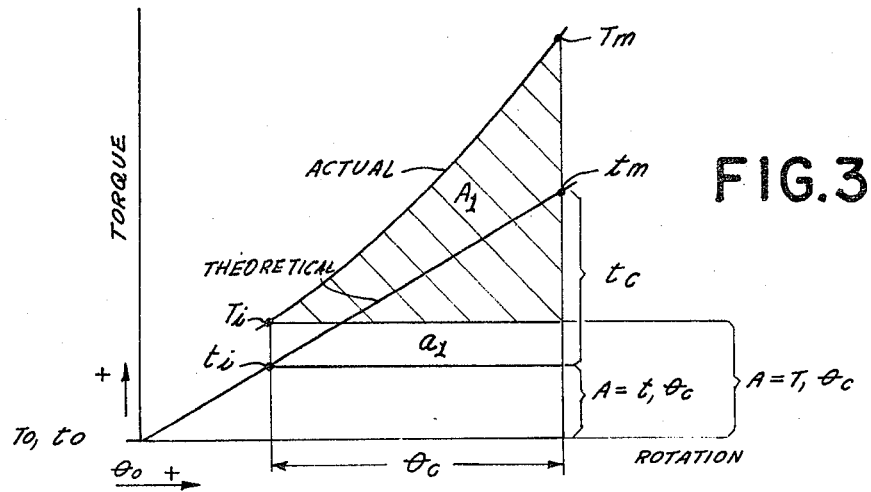
FIG. 3 is a graph illustrating established actual, as well as theoretical torque-angle curves, as used to determine an efficiency factor.

The set points Ti and Tm will now be selected. Ti must be great enough to ensure the parts of the assembly are clamped and Tm must be low enough to ensure the fastener will not yield at this value. The effect of friction is measured by efficiency, which is the actual value of work required, divided into which the value of work required to tighten a fastener if friction was not present. The area under the torque angle curves is proportional to the work or energy required to increase the fastener torque from Ti to Tm. The area under the actual curve from zero torque is Ti $\theta c + A1$ and likewise the area under the theoretical curve is ti $\theta c + a1$, for the $\theta c$ segment of the curves (FIG. 3).
Therefore the efficiency is:

$$\text{Eff.} = \frac{ti\,\theta c + a1}{Ti\,\theta c + A1}$$

Efficiency is also equal to the theoretical torque divided by the actual. Thus $$\text{Eff.} = ti/Ti$$

or $$Ti = ti/\text{Eff.}$$

Substituting $Ti = ti/\text{Eff}$ in the above equation gives $$\text{Eff.} = \frac{ti\,\theta c + a1}{\frac{ti\,\theta c}{\text{Eff.}} + A1}$$

$$\text{Eff.}\left(\frac{ti\,\theta c}{\text{Eff.}} + A1\right) = ti\,\theta c + a1$$

$$ti\,\theta c + \text{Eff.}\,A1 = ti\,\theta c + a1$$

$$\text{Eff.}\,A1 = a1$$

$$\text{Eff.} = \frac{a1}{A1}$$

Figure 2:
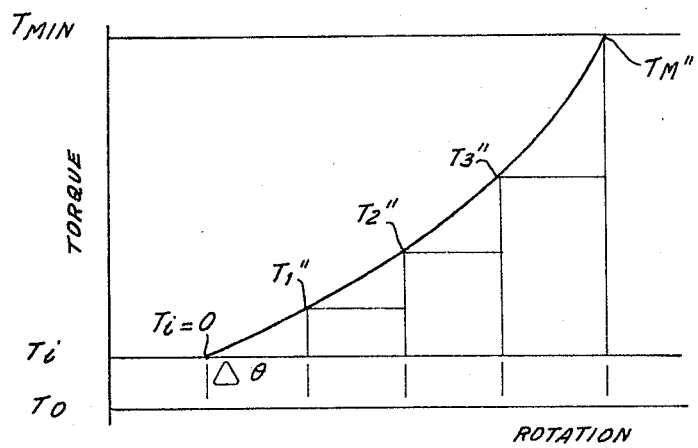
FIG. 2 is a graph illustrating development of a formula for area under an actual torque-angle curve.

Therefore, only the area between Ti and Tm and ti and tm needs to be calculated to determine efficiency. Curve of FIG. 2 shows that the area under the actual curve A1 is: $A1 = \Delta\theta[T_1'' + T_2'' + T_3'' \ldots + \frac{1}{2}TM'']$. Likewise the curve of FIG. 3 shows the area under the theoretical curve is $$a_1 = (\tfrac{1}{2})c_1\theta c^2.$$

The actual area A1 and theoretical area a1 under their respective curves are determined and the efficiency calculated for each tightening cycle. Once the efficiency is known then the theoretical torque value (ti) is determined by multiplying the values of set point Ti and efficiency. Since the equation for the theoretical curve is known, the determination of one torque point on the curve, permits the determination of the torque at any other point. The torque (tm) which is equal to, the torque at (ti) plus the slope multiplied by the angle between ti and tm, or $tm = ti + c_1\theta c$ where $c_1$ is the slope of value ty/$\alpha$y.

The theoretical torque (ta) multiplied by fastener constant is equal to the desired tension or fastener load. Fastener constant refers to axial displacement per angular rotation, which is fixed for any given fastener, or fasteners having the same structural detail i.e., proportions, and is equal to fastener pitch radius multiplied by the lead angle tangent. This theoretical torque (ta) will be obtained when the theoretical torque (tm) is added to the slope ($C_1$) multiplied by the angle ($\beta$) turned beyond (tm) or:

$$ta = tm + c_1\beta.$$

Figure 1:
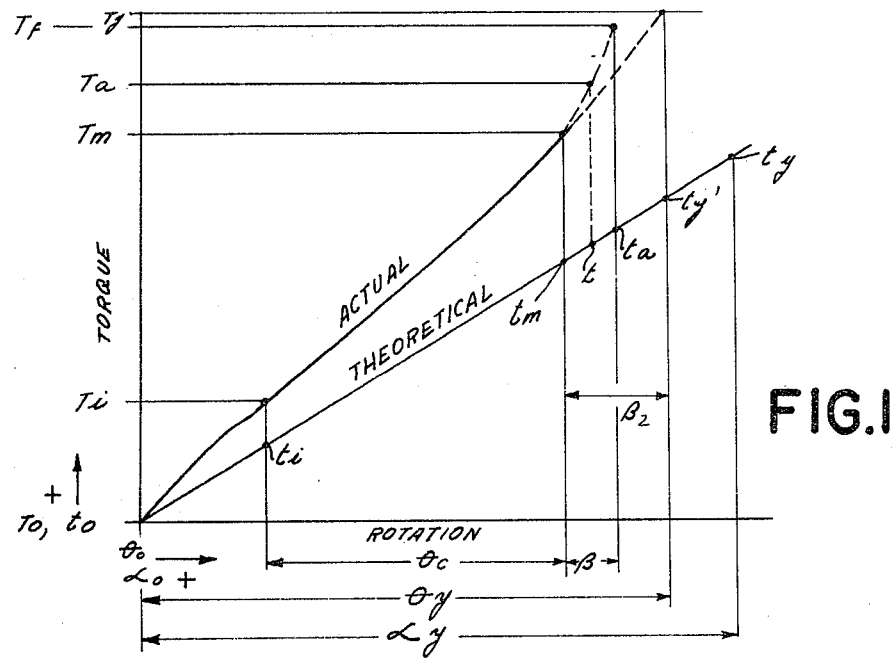
FIG. 1 is a graph illustrating an actual vs. theoretical tightening curve.

If the efficiency remained constant, the actual torque value (Ta) required for ta would be $Ta = ta/tm\,(Tm)$ (FIG. 1).

Since the efficiency may change, the actual torque Ta may not give the theoretical value ta. Thus when the actual torque equals Ta, this value of torque is held on the fastener, but the theoretical torque value (t) is checked to see if it equals (ta). If it does not, a new value of actual torque ($T_f$) is predicted based on the new efficiency and the process is repeated. When the theoretical torque (t) equals (ta), the actual torque required to obtain this is held on the fastener. The efficiency at this point is determined by dividing the theoretical torque (t) by the actual ($T_f$) and displayed. The operator can now check the fastener for the desired tension, since he knows the torque, efficiency, and fastener constant it took to obtain this load.

The foregoing is the procedure followed when the slope $C_1$ can be pre-determined by measuring the tension and elongation that occurred at fastener yield. In the other type of assembly where the latter portion of the tightening cycle consists of assembly part deflection and fastener elongation, the slope must be determined on the complete assembly, since the angle rotation is absorbed by fastener elongation and the assembly. Such is done as follows:

Please refer to curve shown in FIG. 1. The equation of the theoretical torque is still $t = C_1\alpha$, but in this case $C_1$ is unknown. To determine $C_1$, the value of theoretical torque (ty') at the yield point of the actual torque angle curve must be used. This value must be an average value since it does vary somewhat with friction, but it is a value that other tension systems use to control load. The value of angle ($\theta y$) from no load to yield will be a different value than ($\alpha y$). The illustration shows $\theta y$ less than ($\alpha y$), but depending on how much deflection occurs in the assembly, it could be larger than ($\alpha y$).

The slope $C_1$ can be determined in the following manner:

$$ty' = tm + C_1\beta_2 \qquad ti = Ti\,\text{Eff.}$$
$$\text{where } tm = ti + C_1\,\theta c \qquad ti = Ti\frac{a}{A}$$

or $$ty' = ti + C_1\,\theta c + C_1\beta_2 \qquad a = \frac{C_1\,\theta c^2}{2}$$

$$ty' = \frac{TiC_1\,\theta c^2}{2A} + C_1\,\theta c + C_1\beta_2 \qquad ti = \frac{Ti\,C_1\,\theta c^2}{2A}$$

$$C_1 = \frac{ty'}{\frac{Ti\,\theta c^2}{2A} + \theta c + \beta_2}$$

The set points Ti and Tm are selected as hereinbefore described. A set up fastener is then run to yield and $A_1$, $\theta c$ and $\alpha_2$ obtained. The tension system uses these values in the above equation and solves for $C_1$. Once $C_1$ is determined by the set up fastener, the subsequent fasteners are run accordingly.

Operation of the Subject System

Figure 4:
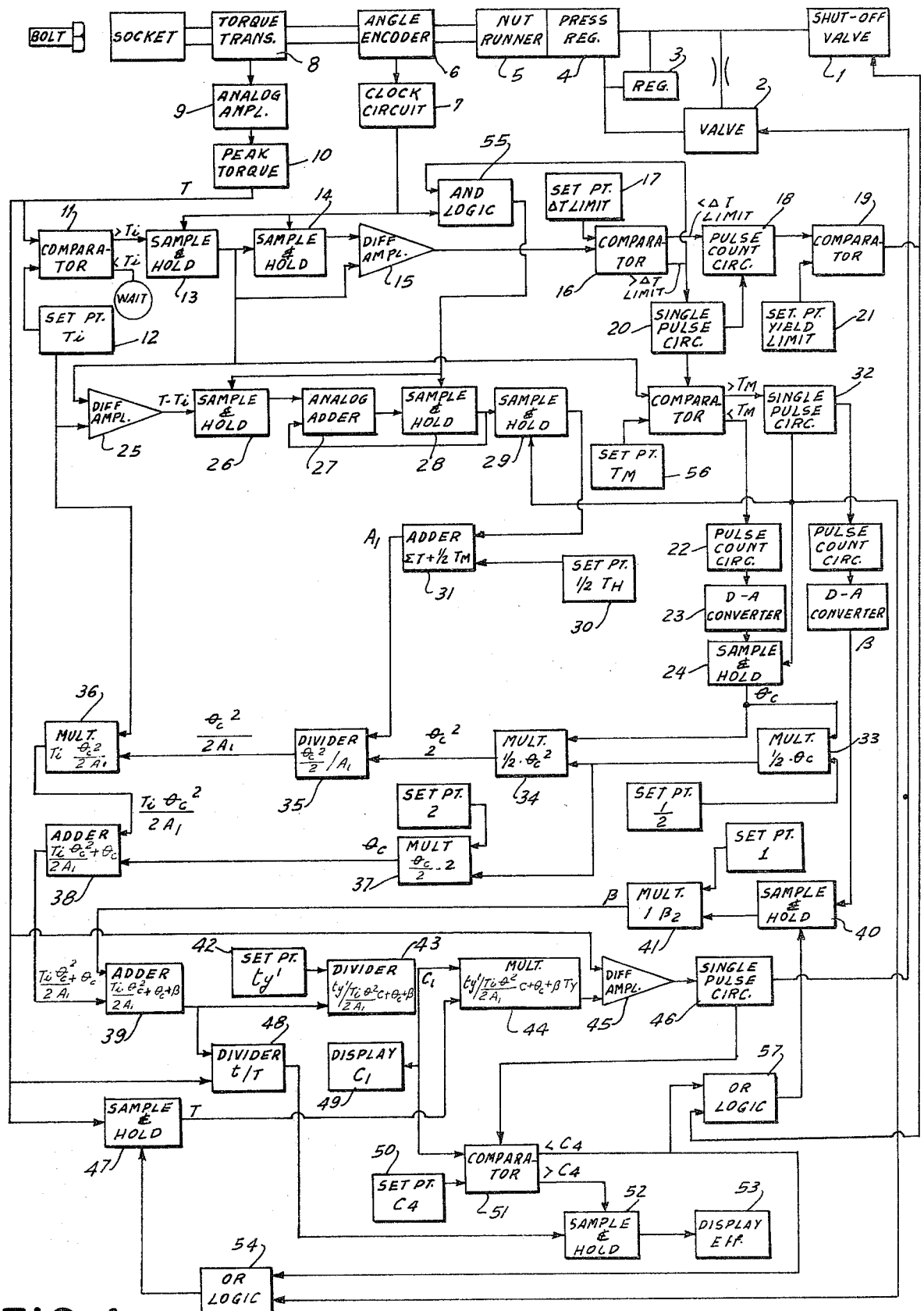
FIG. 4 is a schematic showing apparatus and circuitry to accomplish the system of the invention in set up phase.
Figure 5:
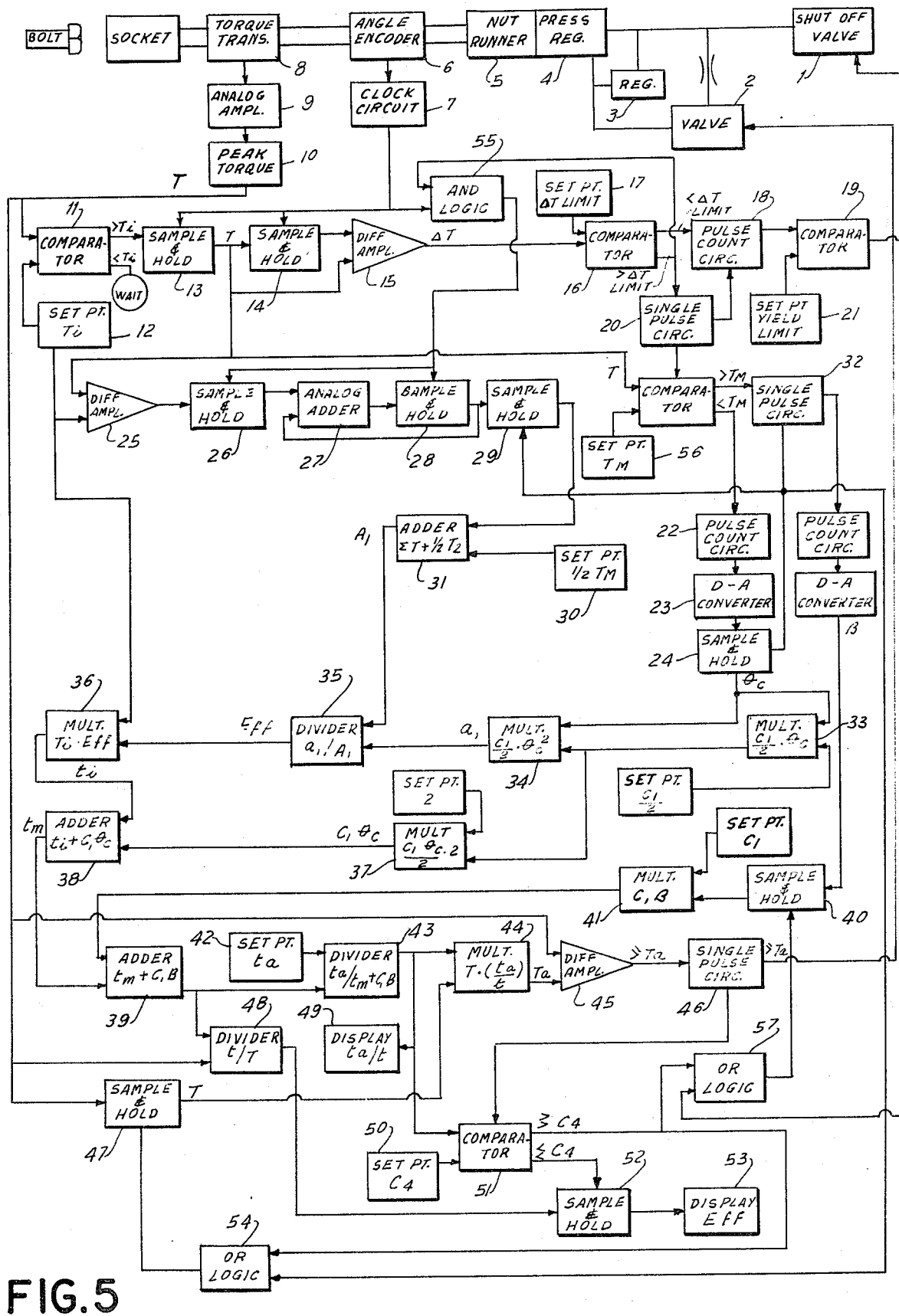
FIG. 5 is the same but showing operation of the system to accomplish a fastener tightening operation.

A schematic of the system is illustrated by circuit arrangements shown in FIGS. 4 and 5. FIG. 4 shows the system in set up and FIG. 5 shows it controlling a tightening cycle.

As seen in FIG. 5, air is fed to a recovery type nut runner (5) such as disclosed in U.S. Pat. No. 3,507,173, granted Apr. 21, 1970. A pressure regulator (3) sets a rundown pressure on a pilot controlled regulator (4). This rundown pressure is a value that causes the fastener to be tightened to a torque exceeding Tm. The nut runner (5) then holds this torque on the fastener.

An angle encoder (6) drives a clock circuit (7) which gives one clock pulse per-degree of fastener rotation in the tightening direction, or can be set for a pulse each two degrees, or whatever degree setting is desired. A torque transducer (8) gives an analog voltage signal that is proportional to the torque being exerted on the fastener. A peak torque element (10) holds the last highest value of torque that passed through it. The torque value is fed to a comparator (11) where nothing happens until the torque value exceeds set point Ti (12).

The first portion of the circuit functions as a fastener yield detector used for emergency shut-off to prevent fastener breakage, and to prevent any angular rotation that occurs without building torque from entering the control circuit.

This circuit operates as follows:

A clock pulse moves a torque value from the comparator (11) holds it in a sample and hold element (13). The same clock pulse moved the previous torque value that was in the sample and hold element (13) to a sample and hold element (14). A differential amplifier (15) takes the difference between these two values and feeds it to a comparator (16). If the difference value is less than a set point value (17), then in passes to a pulse counter (18). If the difference values between successive pulses remain below the set limit (17) for enough pulses to exceed a set limit (21), then the air to the nut runner (5) will be shut off by valve (1). This would be a rejected tightening cycle.

When the difference between successive pulses is greater than the set limit (17) it goes to a single pulse circuit (20) which resets the pulse counter (18). If the torque is less than a set value (56) then the pulse goes on to a pulse count circuit (22). The pulse count circuit (22) totalizes the pulses that are above the limit (17) until the torque becomes equal to a set point (56). Thus the element (22) contains the number of pulses or degrees between the torque points Ti and Tm which is the angle $\theta c$ shown on curve (FIG. 1). This value of pulses is fed to a D-A converter (23) that converts the count to an electric voltage and stores it in a sample and hold element (24). The portion of the circuit (25) thru an adder (31) determines the area ($A_1$) under the actual torque curve per the equation $A = \Delta\theta\ [T_1'' + T_2'' + T_3'' \ldots + \frac{1}{2}Tm'']$ see FIG. 2. The torque value from the sample and hold element (13) is fed to a differential amplifier (25), that subtracts the setpoint value Ti (12) from it. The difference value is then fed to a sample and hold (26). The next clock pulse moves it to an analog adder (27) where it is added to the previous pulse values from the sample and hold (28). An AND logic element (55) is provided to prevent the clocking of the sample and hold elements (26) and (28) when the difference between torque pulses is less than the set point (17). The total of these values are held in the sample and hold (29). When the torque exceeds a set value Tm (56) the next pulse above the set point (17) passes through a single pulse circuit (32). This circuit puts out a clock pulse which moves the value in the sample and hold (29) to the adder (31). It is then added to a set point value (30). The output of adder (31) is the value of $A_1$ shown on the curve of FIG. 2.

The clock pulse from circuit (32) also moves the value of $\theta c$ stored in the sample and hold (24) to a multiplier (33), where it is multiplied by a set point $\frac{1}{2}_1$. This value then goes to another multiplier (34) where it is multiplied by $\theta c$ again. The output of this multiplier is $C_1\theta c^2/2$ or $a_1$ per the equation on curve of FIG. 3.

The values $A_1$ from adder (31) and $a_1$ from the multiplier (34) are fed to a divider (35). The output of divider (35) is the Eff. A multiplier (36) multiplies the set point Ti (12) by the Eff. to obtain the theoretical torque ti. The theoretical torque value from (36) is added by an adder (38) to the output $C_1\theta_c$ from multiplier (37). The output of adder (38) is theoretical torque value tm. This value tm is fed to an adder (39) to be added to the value $(C_1\beta)$ from a multiplier (41). The value $C_1\beta$ is the value of the angle past Tm multiplied by the slope constant $C_1$. At Tm this value is zero, thus the output of adder (39) is still tm. The value of tm then goes to a divider (43) where it is divided into the theoretical torque value ta from a set point (42). The value ta is the theoretical torque needed to obtain desired clamp load. The clock pulse from (32), when the torque exceeded Tm, passed through an OR logic element (54) and clocked the value of torque on the fastener at Tm to multiplier (44). The output from a divider (43) ta/t is multiplied by torque from a sample and hold (47). This is the value of actual torque Ta that will give the theoretical torque value ta if the efficiency remains constant. Value Ta from (44) is fed to a differential amplifier (45). When the actual torque equals or exceeds Ta, a voltage will be given from the amplifier (45). This signal goes to valve (2) which stops the pressure to the nut runner from increasing. Thus this torque value will be held on the fastener. The signal from amplifier (45) also passed through a single pulse circuit (46). This circuit (46) produces a clock pulse that goes to a comparator (51). If the value ta/tm from divider (43) is greater than set point (50), the clock pulse will pass through a logic element (57) to sample and hold (40) and through (54) to (47). When the sample and hold (40) is clocked, a value of $\beta$ is fed to multiplier (41). The output of (41) is added to (tm) at the adder (39). This value is divided into (ta) by the divider (43). The clock pulse at sample and hold (47) clocks the present value of torque on the fastener and said value is sent to the multiplier (44). The output of the multiplier (44) is now the new torque predicted to obtain the theoretical torque value (ta). If the new predicted torque is greater than the torque now on the fastener, the output of amplifier (45) will stop and valve (2) will reopen and the pressure to the tool will increase.

This cycle will repeat until the theoretical torque (t) equals desired percentage of (ta). At this point the actual torque will equal the predicted torque and valve (2) will be closed, holding this torque value on the fastener. The clock pulse from circuit (46) will pass through the comparator (51) to the sample and hold (52), since the value ta/t will be less than set point (50).

The clock pulse at (52) will clock the value of the efficiency from divider (48) to display (53). The cycle is now complete.

Please refer to the schematic in FIG. 4 for the operational description of the system in set-up. The value "one" is put in for $C_1$ and the value ty', from curve of FIG. 1 is put in for ta. A tightening cycle will be run on the actual assembly. The yield detecting circuit, items (13) thru (19) will terminate the tightening cycle at yield. The value $C_1$ will be determined by the equation $$C_1 = ty'/\frac{Ti\theta c^2}{2A} + \theta c + \beta.$$

When the torque exceeds Ti, items (25) thru (31) calculate the area under the actual torque curve $A_1$, as explained in the tightening cycle. Once the torque exceeds Tm set point (56) the circuit (32) gives out a single clock pulse. This pulse clocks the value $\theta c$ from the sample and hold (24) to the multiplier (33). Since $C_1$ is now one, $\theta c$ is multiplied by $\frac{1}{2}$. This value $\frac{1}{2}\theta c$ goes to multiplier (34) where it is multiplied again by $\theta c$. The output of multiplier (34) is now $\theta c^2/2$. This value goes to the divider (35) where it is divided by $A_1$ from the adder (31). The output from the divider (35) is fed to the multiplier (36), where it is multiplied by Ti set point (12). The output of (36) is now Ti $\theta c^2/2A_1$. The value $\frac{1}{2}\theta c$ from the multiplier (33) also goes to multiplier (37) where it becomes $\theta c$. This value $\theta c$ is now added to the output value of multiplier (36) by adder (38). The output of adder (38) is Ti $\theta c^2/2A_1+\theta c$. When the yield detecting circuit gives the signal from the comparator (19) to close the valve (1), this signal also goes to the OR logic element (57). The signal passes through the logic element (57) and clocks the sample and hold (40). This moves the value of the angle from Tm to yield ($\beta$) to the multiplier (41). Since a value of one was put in for $C_1$ the output of multiplier (41) is still ($\beta$). This value goes to adder (39) to be added to the output of adder (38). The output of adder (39) is now Ti $\theta c^2/2A+\theta c+\beta$. The divider (43) now divides this value into ty' from set point (42). The output of divider (43) is the value $C_1$ and is displayed in item (49).

The value $C_1$ and ta will now be put in their set-point elements. The system can now be used to control the tightening cycle as illustrated in FIG. 5.

What is claimed is:

1. A tension control tightening method wherein a motor is powered to run down and set a fastener and means are provided to regulate power to the motor to obtain a predetermined tension set on the fastener, said method comprising the steps of:
    initiating operation of the motor for turning the fastener;
    generating a signal indicative of fastener rotations;
    generating a signal proportional to the torque being exerted upon the fastener by the rotation means;
    utilizing both of said signals to determine the work being expended on the fastener;
    comparing said work to equivalent work on a theoretical fastener having no friction load;
    establishing an efficiency factor based on said comparisons;
    utilizing said efficiency factor to determine actual torque required to obtain predetermined tension on the fastener; and
    cutting off power to the motor when said predetermined tension is obtained on the fastener.

2. In a tension control tightening method according to claim 1, wherein the method is being employed to simultaneously run down and set a plurality of similar fasteners, the steps of:
    maintaining predetermined tension in each fastener until said predetermined tension is obtained on all of said fasteners; and cutting off power to all fastener motors when said predetermined tension is obtained on all the fasteners.

3. In a tension control tightening method according to claim 1, wherein said efficiency factor is the ratio between the area under a theoretical torque rotation curve between first and second rotation points on the theoretical curve, and the area under an actual torque rotation curve between said two rotation points on the actual curve.

4. In a tension control tightening method according to claim 3, wherein theoretical torque multiplied by a fastener constant equals desired fastener tension.

5. In a tension control tightening system according to claim 4, wherein the torque exerted on the fastener at the first rotation point is great enough to ensure that the parts of an assembly being held by the fastener are fully clamped together, and the torque exerted on the fastener at the second rotation point is low enough to ensure that the fastener yield point is not exceeded.

6. Apparatus for use in a tension control tightening method for running down and setting a fastener comprising a recovery type nut runner:
    means to supply operative power to said nut runner;
    means to measure torque being exerted by the nut runner on the fastener;
    means to develop a signal which indicates rotation on the fastener caused by the nut runner;
    means to develop an analog signal which is proportional to torque being exerted by the nut runner on the fastener;
    means to utilize both signals to determine work being expended on the fastener by the nut runner;
    means to compare said work to equivalent work on a theoretical fastener having no friction load;
    means to establish an efficiency factor based on comparisons carried out by the comparing means;
    means to utilize said efficiency factor to determine actual torque required to obtain predetermined tension on the fastener; and
    means to cut off said operative power to the nut runner when said actual torque is developed on the fastener.

7. The apparatus of claim 6, wherein a plurality of said nut runners are utilized for simultaneously running down a plurality of similar fasteners to obtain said predetermined tension in each of said fasteners; and
    means to cut off operative power to all of said nut runners when said predetermined tension is developed on each of said plurality of fasteners.

* * * * *